United States Patent
Binek et al.

(10) Patent No.: US 12,203,386 B2
(45) Date of Patent: Jan. 21, 2025

(54) COMPRESSOR-TURBINE ROTATING ASSEMBLY WITH INTEGRAL COOLING CIRCUIT(S)

(71) Applicant: Raytheon Technologies Corporation, Farmington, CT (US)

(72) Inventors: Lawrence A. Binek, Glastonbury, CT (US); Sean R. Jackson, Palm City, FL (US); Jose R. Paulino, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/675,564

(22) Filed: Feb. 18, 2022

(65) Prior Publication Data

US 2023/0265761 A1  Aug. 24, 2023

(51) Int. Cl.
  *F01D 5/18* (2006.01)
  *F01D 25/12* (2006.01)
  *F02C 7/12* (2006.01)

(52) U.S. Cl.
  CPC .............. *F01D 5/18* (2013.01); *F01D 25/12* (2013.01); *F02C 7/12* (2013.01); *F05D 2220/32* (2013.01); *F05D 2260/20* (2013.01)

(58) Field of Classification Search
  CPC .......... F01D 5/087; F01D 5/085; F01D 5/046; F01D 5/048; F01D 25/12; F01D 5/18; F05D 2260/20; F05D 2220/32; F05D 2240/60; F05D 2240/61; F02C 7/12
  See application file for complete search history.

(56) References Cited

U.S. PATENT DOCUMENTS

| | | | | |
|---|---|---|---|---|
| 5,605,045 A * | 2/1997 | Halimi | ................... | F02B 39/10 417/407 |
| 6,637,500 B2 | 10/2003 | Shah | | |
| 7,785,071 B1 * | 8/2010 | Liang | ..................... | F01D 5/187 416/97 R |
| 9,033,670 B2 | 5/2015 | Mittendorf | | |
| 10,260,355 B2 | 4/2019 | Smoke | | |
| 10,465,603 B1 * | 11/2019 | Sachdev | ................. | F01D 5/087 |
| 10,830,146 B2 * | 11/2020 | Yin | ............................ | F02C 7/18 |
| 2013/0098061 A1 * | 4/2013 | Matwey | ................ | F04D 29/285 60/785 |
| 2013/0272882 A1 * | 10/2013 | Mittendorf | ............. | F01D 5/046 29/889.22 |
| 2013/0280036 A1 * | 10/2013 | Jan | ......................... | F01D 5/088 415/66 |

(Continued)

FOREIGN PATENT DOCUMENTS

WO  2019138497 A1  7/2019

OTHER PUBLICATIONS

EP search report for EP23157388.2 dated Jul. 21, 2023.

*Primary Examiner* — Courtney D Heinle
*Assistant Examiner* — Andrew Thanh Bui
(74) *Attorney, Agent, or Firm* — Getz BalichLLC (57) ABSTRACT

An assembly is provided for a gas turbine engine. This assembly includes a compressor rotor, a turbine rotor and a cooling circuit. The compressor rotor includes a gas path surface. The turbine rotor is rotatable with the compressor rotor about a rotational axis. The cooling circuit includes an inlet in the gas path surface. The cooling circuit extends from the inlet, through the compressor rotor and into the turbine rotor.

19 Claims, 7 Drawing Sheets

(56) References Cited

U.S. PATENT DOCUMENTS

| | | | |
|---|---|---|---|
| 2014/0348664 A1* | 11/2014 | Jan | F01D 5/081 |
| | | | 416/96 R |
| 2017/0058896 A1* | 3/2017 | Collins | F04C 18/107 |
| 2017/0107821 A1 | 4/2017 | Schwarz | |
| 2017/0254209 A1* | 9/2017 | Smoke | F01D 5/046 |
| 2019/0264612 A1* | 8/2019 | Brown | F01D 5/025 |
| 2020/0072168 A1* | 3/2020 | Kratzsch | F04D 17/08 |
| 2020/0240279 A1* | 7/2020 | Wedig | F02K 3/06 |
| 2020/0263568 A1 | 8/2020 | Copeland | |
| 2020/0300115 A1 | 9/2020 | Aurahs | |
| 2020/0338639 A1 | 10/2020 | Friesth | |
| 2020/0406354 A1 | 12/2020 | Zarandi | |
| 2022/0034227 A1 | 2/2022 | Dierksmeier | |

\* cited by examiner

COMPRESSOR-TURBINE ROTATING ASSEMBLY WITH INTEGRAL COOLING CIRCUIT(S)

BACKGROUND OF THE DISCLOSURE

1. Technical Field

This disclosure relates generally to a gas turbine engine and, more particularly, to cooling a turbine rotor within the gas turbine engine.

2. Background Information

A gas turbine engine includes a compressor section, a combustor section and a turbine section. Some gas turbine engines may be configured with an axial flow turbine rotor, where combustion product flow generally axially through the turbine section. Other typically smaller gas turbine engines may be configured with a radial flow turbine rotor, where combustion products flow radially into the turbine section, are turned by the radial flow turbine rotor, and flow generally axially out of the turbine section. While known radial flow turbine rotors have various advantages, there is still room in the art for improvement. There is a need in the art, for example, for a relatively small radial flow turbine rotor which can withstand relatively high turbine section temperatures and/or exposure to prolonged elevated turbine section temperatures.

SUMMARY OF THE DISCLOSURE

According to an aspect of the present disclosure, an assembly is provided for a gas turbine engine. This assembly includes a compressor rotor, a turbine rotor and a cooling circuit. The compressor rotor includes a gas path surface. The turbine rotor is rotatable with the compressor rotor about a rotational axis. The cooling circuit includes an inlet in the gas path surface. The cooling circuit extends from the inlet, through the compressor rotor and into the turbine rotor.

According to another aspect of the present disclosure, another assembly is provided for a gas turbine engine. This assembly includes a monolithic body rotatable about a rotational axis. The monolithic body includes a compressor rotor, a turbine rotor and a cooling circuit. The compressor rotor includes a compressor hub and a plurality of compressor blades arranged circumferentially about and connected to the compressor hub. The turbine rotor includes a turbine hub and a plurality of turbine blades arranged circumferentially about and connected to the turbine hub. The cooling circuit extends within the monolithic body from an inlet in the compressor rotor to an outlet in the turbine rotor.

According to still another aspect of the present disclosure, another assembly is provided for a gas turbine engine. This assembly includes a compressor rotor and a turbine rotor. The compressor rotor includes a compressor hub and a plurality of compressor blades arranged circumferentially about and connected to the compressor hub. The turbine rotor is rotatable with the compressor rotor. The turbine rotor includes a turbine hub and a plurality of turbine blades arranged circumferentially about and connected to the turbine hub. The cooling circuit includes an inlet and an outlet. The cooling circuit extends from the inlet, through the compressor hub and the turbine hub, to the outlet.

The assembly may also include a shaft connected to and extending axially between the compressor rotor and the turbine rotor. The cooling circuit may extend through the shaft from the compressor rotor to the turbine rotor.

The compressor rotor may be configured as a radial flow compressor rotor. The turbine rotor may also or alternatively be configured as a radial flow turbine rotor.

At least or only the compressor rotor and the turbine rotor may be formed together as a monolithic body.

The compressor rotor may include a hub and a plurality of blades. The hub may include the gas path surface. The blades may be arranged circumferentially about the hub. The blades may project out from the gas path surface.

The turbine rotor may include a turbine rotor surface. The cooling circuit may also include an outlet in the turbine rotor surface. The cooling circuit may extend through the turbine rotor to the outlet fluidly coupling the inlet to the outlet.

The turbine rotor surface may be or otherwise include a turbine gas path surface.

The turbine rotor may include a hub and a plurality of blades. The blades may be arranged circumferentially about the hub. The blades may project out from the turbine rotor surface.

The turbine rotor surface may form a peripheral boundary of a bore in the turbine rotor.

The cooling circuit may at least or only include the inlet, the outlet and a passage extending from the inlet to the outlet.

The cooling circuit may also include a second inlet in the compressor rotor. The cooling circuit may extend from the second inlet, through the compressor rotor and into the turbine rotor fluidly coupling the second inlet to the outlet.

The second inlet may be in the gas path surface.

The second inlet may be axially spaced from the inlet along the rotational axis.

The second inlet may be circumferentially spaced from the inlet about the rotational axis.

The cooling circuit may include a first capillary, a second capillary and an artery. The first capillary may extend from the inlet to the artery. The second capillary may extend from the second inlet to the artery. The artery may extend to the outlet.

The first capillary may be or otherwise include a helical capillary. The second capillary may also or alternatively be or otherwise include a helical capillary. The artery may still also or alternatively be or otherwise include a helical artery.

At least a portion of the cooling circuit may spiral about the rotational axis as the cooling circuit extends from the inlet to the outlet.

The assembly may also include a second cooling circuit. The second cooling circuit may include a second inlet in the gas path surface. The second cooling circuit may extend from the second inlet, through the compressor rotor and into the turbine rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
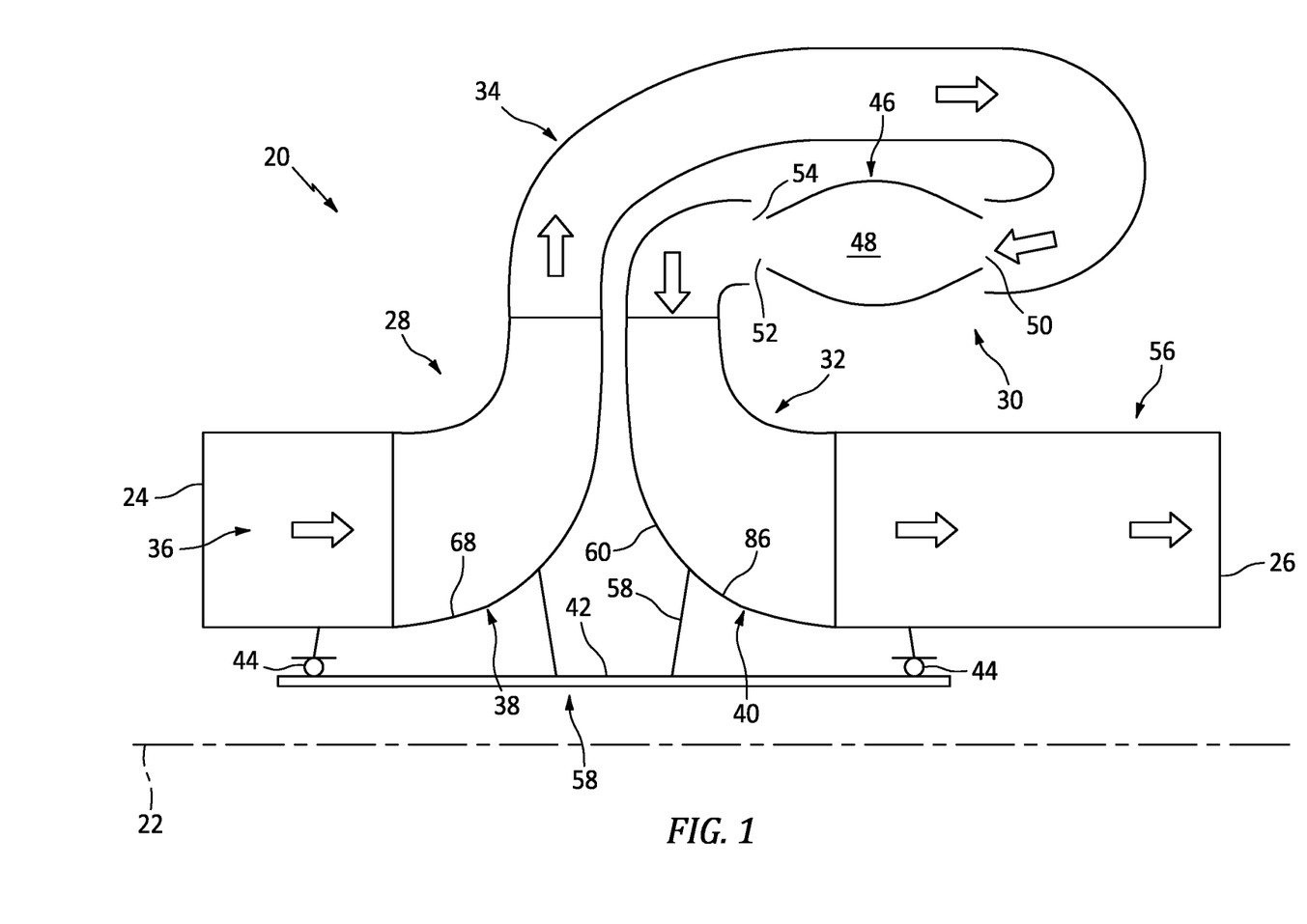
FIG. 1 is a partial, sectional schematic illustration of a gas turbine engine.

FIG. 1 is a partial, sectional schematic illustration of a gas turbine engine 20. This gas turbine engine 20 of FIG. 1 is a single spool, radial flow gas turbine engine. The gas turbine engine 20 may be configured as an auxiliary power unit (APU), a supplemental power unit (SPU) or a primary power unit (PPU) for generating shaft power, electrical power, bleed flow, or other uses for an aircraft. The gas turbine engine 20 may alternatively be configured as a turbojet gas turbine engine, a turboshaft gas turbine engine, a turboprop gas turbine engine or any other type of gas turbine engine that generates thrust for propelling the aircraft during flight. The present disclosure, however, is not limited to such an exemplary gas turbine engine nor to aircraft propulsion system applications. For example, the gas turbine engine 20 may alternatively include more than one spool and/or be configured in a land based gas turbine engine configured for electrical power generation, an air power generation unit for air mobility, a hybrid power architecture unit, etc.

The gas turbine engine 20 of FIG. 1 extends axially along an axial centerline 22 between a forward, upstream airflow inlet 24 and an aft, downstream airflow exhaust 26. This axial centerline 22 may also be a rotational axis for various components within the gas turbine engine 20.

The gas turbine engine 20 includes a compressor section 28, a combustor section 30 and a turbine section 32. The gas turbine engine 20 also includes a static engine structure 34. This static engine structure 34 houses the compressor section 28, the combustor section 30 and the turbine section 32. The static engine structure 34 of FIG. 1 also forms the airflow inlet 24 and the airflow exhaust 26.

The engine sections 28, 30 and 32 are arranged sequentially along a (e.g., annular) core flowpath 36 as the core flowpath 36 extends through the gas turbine engine 20 from the airflow inlet 24 to the airflow exhaust 26. The compressor section 28 and the turbine section 32 each include a respective rotor 38, 40. The compressor rotor 38 may be configured as a radial flow compressor rotor, which may also be referred to as a radial outflow compressor rotor. The compressor rotor 38 of FIG. 1, for example, is configured to receive an axial inflow and provide a radial outflow. The compressor rotor 38 of FIG. 1 thereby turns an axial flow radially outward. Similarly, the turbine rotor 40 may be configured as a radial flow turbine rotor, which may also be referred to as a radial inflow turbine rotor. The turbine rotor 40 of FIG. 1, for example, is configured to receive a radial inflow and provide an axial outflow. The turbine rotor 40 of FIG. 1 thereby turns a radial flow axially aft.

The compressor rotor 38 is connected to the turbine rotor 40 through an engine shaft 42. This shaft 42 is rotatably supported by the static engine structure 34 through a plurality of bearings 44; e.g., rolling element bearings, thrust bearings, journal bearings, etc.

The combustor section 30 includes a (e.g., annular) combustor 46 with a (e.g., annular) combustion chamber 48. The combustor 46 may be configured as a reverse flow combustor. Inlets ports into the combustion chamber 48, for example, may be arranged at (e.g., on, adjacent or proximate) and/or towards an aft end 50 of the combustor 46. An outlet 52 from the combustor 46 may be arranged axially aft of an inlet 54 to the turbine section 32. The combustor 46 may also be arranged radially outboard of and/or axially overlap at least a (e.g., aft) portion of the turbine section 32. With this arrangement, the core flowpath 36 of FIG. 1 reverses its directions (e.g., from a forward-to-aft direction to an aft-to-forward direction) a first time as the core flowpath 36 extends into the combustion chamber 48. The core flowpath 36 of FIG. 1 then reverses its direction (e.g., from the aft-to-forward direction to the forward-to-aft direction) a second time as the core flowpath 36 extends from the combustion chamber 48 into the turbine section 32. The present disclosure, however, is not limited to the foregoing exemplary combustor section arrangement.

During operation, air enters the gas turbine engine 20 and, more particularly, the core flowpath 36 through the airflow inlet 24. The air within the core flowpath 36 may be referred to as core air. This core air is compressed by the compressor rotor 38 and directed into the combustion chamber 48. Fuel is injected via one or more fuel injectors (not shown) and mixed with the compressed core air to provide a fuel-air mixture. This fuel-air mixture is ignited within the combustion chamber 48 via an igniter (not shown), and combustion products thereof flow through the turbine section 32 and cause the turbine rotor 40 to rotate. This rotation of the turbine rotor 40 drives rotation of the compressor rotor 38 and, thus, compression of the air received from the airflow inlet 24. An exhaust section 56 of the gas turbine engine 20 receives the combustion products from the turbine section 32. This exhaust section 56 directs the received combustion products out of the gas turbine engine 20 through the airflow exhaust 26.

Cycle performance of the gas turbine engine 20 may be tied to temperature within the turbine section 32. Generally speaking, increasing the turbine section 32 temperature may facilitate increasing gas turbine engine efficiency and/or power generation. However, typical turbine rotor materials may degrade when subject to relatively high turbine section temperatures. A compressor-turbine rotating assembly 58 (e.g., a spool) of the present disclosure therefore is configured with internal cooling to facilitate provision of higher turbine section temperatures and/or operation at elevated turbine section temperatures for longer durations.

Figure 2:
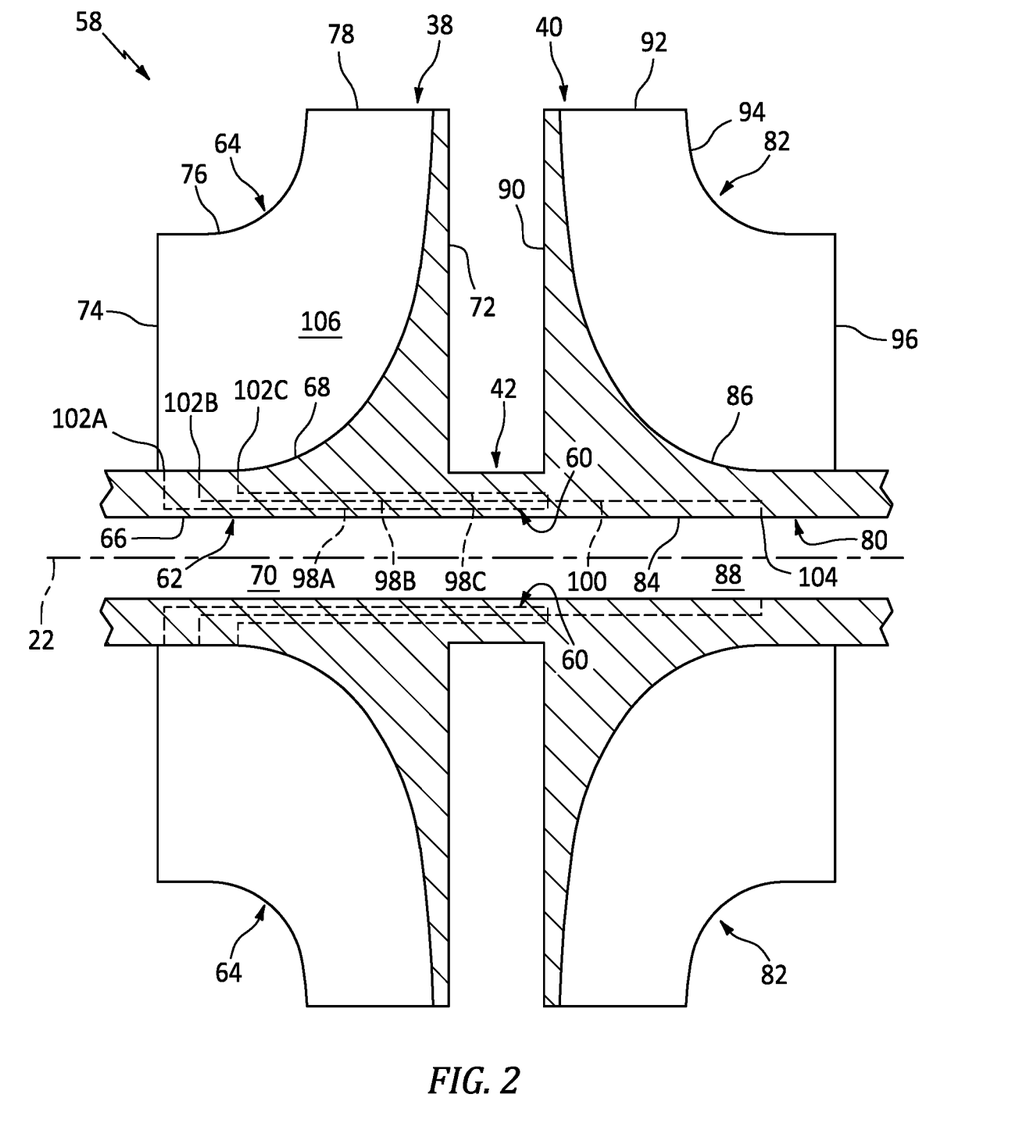
FIG. 2 is a partial, sectional schematic illustration of a rotating assembly for the gas turbine engine.

Referring to FIG. 2, the rotating assembly 58 includes the compressor rotor 38, the turbine rotor 40 and the shaft 42. This rotating assembly 58 also includes one or more internal cooling circuits 60 configured to provide the internal cooling to the turbine rotor 40.

The compressor rotor 38 includes a compressor hub 62 and a plurality of compressor blades 64; e.g., compressor vanes. The compressor hub 62 of FIG. 2 extends radially between and to an inner surface 66 (e.g., bore surface) of the compressor hub 62 and a gas path surface 68 of the compressor hub 62. The compressor inner surface 66 may form an outer peripheral boundary of an internal bore 70 within the compressor rotor 38, which internal compressor bore 70 of FIG. 2 extends axially through the compressor rotor 38. Referring to FIG. 1, the compressor gas path surface 68 may form a (e.g., radial and/or axial) peripheral boundary of the core flowpath 36 within the compressor section 28. Referring again to FIG. 2, the compressor hub 62 also extends axially between and to the compressor gas path surface 68 and an aft, downstream side surface 72 of the compressor hub 62.

The compressor blades 64 are arranged circumferentially about the compressor hub 62 and the axial centerline 22 in an annular array. The compressor blades 64 are connected to (e.g., formed integral with) the compressor hub 62. Each of the compressor blades 64 of FIG. 2 projects (e.g., axially forward) from the compressor hub 62 and its compressor gas path surface 68 to a leading edge 74 of the respective compressor blade 64, as well as a (e.g., unsupported, unshrouded) side 76 of the respective compressor blade 64. Each of the compressor blades 64 of FIG. 2 also projects (e.g., radially outward) from the compressor hub 62 and its compressor gas path surface 68 to a trailing edge 78 of the respective compressor blade 64, as well as the respective compressor blade side 76.

The turbine rotor 40 includes a turbine hub 80 and a plurality of turbine blades 82; e.g., turbine vanes. The turbine hub 80 of FIG. 2 extends radially between and to an inner surface 84 (e.g., bore surface) of the turbine hub 80 and a gas path surface 86 of the turbine hub 80. The turbine inner surface 84 may form an outer peripheral boundary of an internal bore 88 within the turbine rotor 40, which internal turbine bore 88 of FIG. 2 extends axially through the turbine rotor 40. This internal turbine bore 88 and the internal compressor bore 70 may be parts of a common bore internal to the rotating assembly 58, which internal rotating assembly bore may extend axially along the axial centerline 22 through the rotating assembly 58. Alternatively, the internal turbine bore 88 may be discrete from the internal compressor bore 70. Referring to FIG. 1, the turbine gas path surface 86 may form a (e.g., radial and/or axial) peripheral boundary of the core flowpath 36 within the turbine section 32. Referring again to FIG. 2, the turbine hub 80 also extends axially between and to the turbine gas path surface 86 and a forward, upstream side surface 90 of the turbine hub 80.

The turbine blades 82 are arranged circumferentially about the turbine hub 80 and the axial centerline 22 in an annular array. The turbine blades 82 are connected to (e.g., formed integral with) the turbine hub 80. Each of the turbine blades 82 of FIG. 2 projects (e.g., radially outward) from the turbine hub 80 and its turbine gas path surface 86 to a leading edge 92 of the respective turbine blade 82, as well as a (e.g., unsupported, unshrouded) side 94 of the respective turbine blade 82. Each of the turbine blades 82 of FIG. 2 also projects (e.g., axially aft) from the turbine hub 80 and its turbine gas path surface 86 to a trailing edge 96 of the respective turbine blade 82, as well as the respective turbine blade side 94.

At least a segment (or an entirety) of the shaft 42 extends axially along the axial centerline 22 between the compressor rotor 38 and its compressor hub 62 and the turbine rotor 40 and its turbine hub 80. The shaft 42 is connected to (e.g., formed integral with) the compressor rotor 38 and its compressor hub 62 and the turbine rotor 40 and its turbine hub 80. The shaft 42 thereby rotationally couples/links the turbine rotor 40 to the compressor rotor 38.

Figure 3:
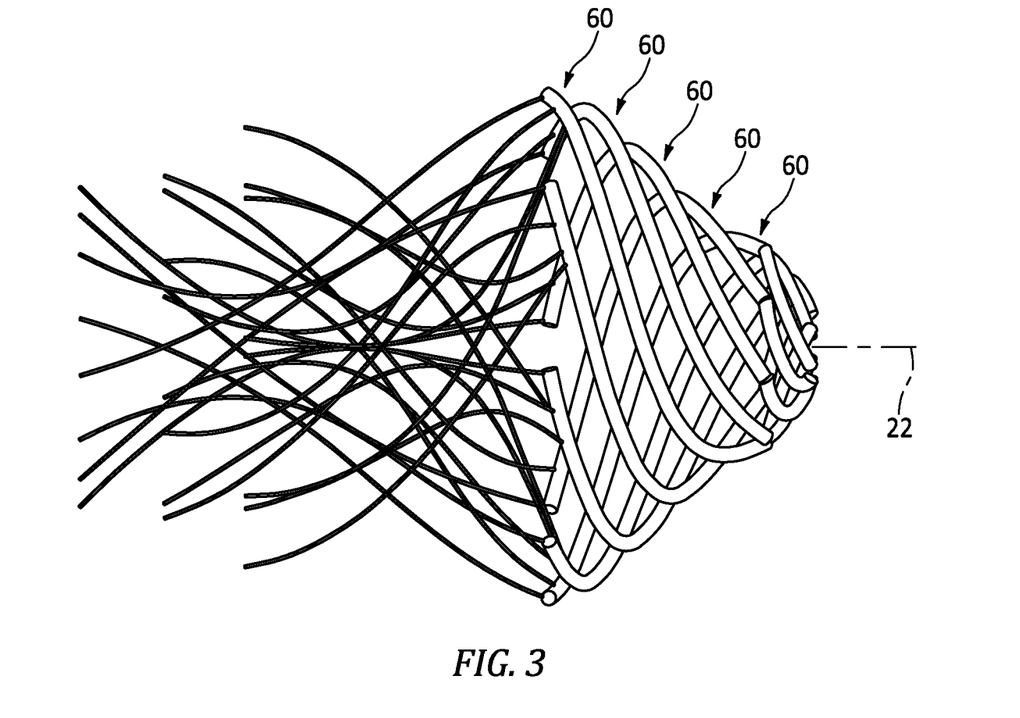
FIG. 3 is perspective illustration of a plurality of internal cooling circuits depicted as positive elements for ease of illustration.
Figure 4:
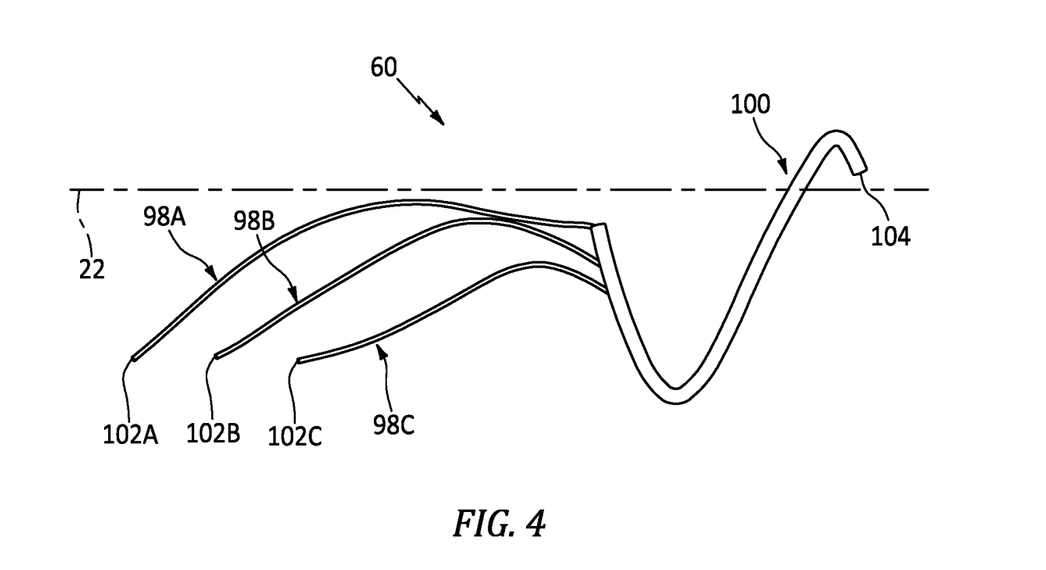
FIG. 4 is a perspective illustration of one of the internal cooling circuits depicted as a positive element for ease of illustration.

Referring to FIG. 3, the internal cooling circuits 60 are arranged circumferentially about the axial centerline 22 in an annular array. Referring to FIGS. 2 and 4, each of the internal cooling circuits 60 may include one or more cooling circuit inlet passages 98A-C (generally referred to as 98) (e.g., capillaries), at least (or only) one cooling circuit outlet passage 100 (e.g., artery), one or more cooling circuit inlets 102A-C (generally referred to as 102), and at least (or only) one cooling circuit outlet 104.

Each of the inlet passages 98 extends longitudinally between and to a respective one of the circuit inlets 102 and the outlet passage 100. Each inlet passage 98 may be configured into a forward, upstream portion of the rotating assembly 58, which rotating assembly portion includes one or more of the rotating assembly components 38, 42 and 62. Each inlet passage 98 of FIG. 2, for example, extends from its circuit inlet 102—through the compressor rotor 38 and its hub 62, through the shaft 42, and to or into the turbine rotor 40 and its hub 80—to the outlet passage 100. The outlet passage 100 extends longitudinally between and to the inlet passages 98 and the circuit outlet 104. The outlet passage 100 may be configured into an aft, downstream portion of the rotating assembly 58, which rotating assembly portion includes at least the turbine rotor 40. The outlet passage 100 of FIG. 2, for example, extends from the inlet passages 98—within or through the turbine rotor 40 and its hub 80—to the circuit outlet 104. The respective internal cooling circuit 60 and its passages 98 and 100 thereby extend through (or within) the rotating assembly 58, and may fluidly couple the circuit inlets 102 to the circuit outlet 104 in parallel.

Referring to FIG. 4, at least a portion or an entirety of one or more or all of the internal cooling circuits 60 may each spiral about the axial centerline 22 as the respective internal cooling circuit 60 extends, for example, from one or more or all of its circuit inlets 102 to its circuit outlet 104. More particularly, one or more or all of the inlet passages 98 may each have a helical geometry. Each inlet passage 98 of FIG. 4, for example, extends circumferentially about (e.g., partially or completely around) the axial centerline 22 as the respective inlet passage 98 extends longitudinally and axially from its circuit inlet 102 to the outlet passage 100. The outlet passage 100 may also or alternatively have a helical geometry. The outlet passage 100 of FIG. 4, for example, extends circumferentially about (e.g., partially or completely around) the axial centerline 22 as the outlet passage 100 extends longitudinally and axially from the inlet passages 98 to the outlet passage 100.

A pitch of the outlet passage helical geometry may be selected based on cooling requirements for the turbine rotor 40 (see FIG. 2). For example, to increase surface area of the outlet passage 100 within the turbine rotor 40 and, thus, increase turbine rotor cooling, the pitch of the outlet passage helical geometry may be decreased. By contrast, to decrease the surface area of the outlet passage 100 within the turbine rotor 40 and, thus, decrease turbine rotor cooling, the pitch of the outlet passage helical geometry may be increased. The pitch of the outlet passage helical geometry may be the same as or different (e.g., less) than a pitch of each inlet passage helical geometry.

Figure 5:
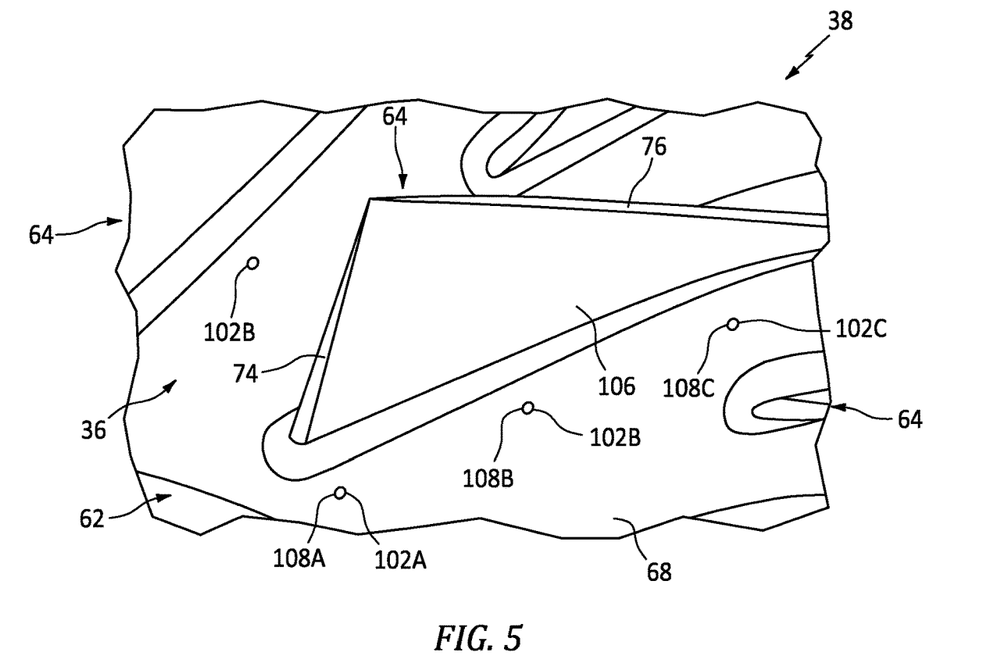
FIG. 5 is a perspective illustration of a portion of a compressor rotor.

Referring to FIG. 5, one or more or all of the circuit inlets 102 for a respective internal cooling circuit 60 (see FIGS. 2 and 4) may be disposed in the compressor gas path surface 68. With this arrangement, the respective internal cooling circuit 60 (see FIGS. 2 and 4) may draw a quantity of the (e.g., relatively cool and pressurized) core air from the core flowpath 36 within the compressor section 28 for cooling the rotating assembly 58 and its turbine rotor 40 (see FIG. 2). The circuit inlets 102 may be distributed along and/or to a (e.g., concave, pressure) side 106 of a respective one of the compressor blades 64. The circuit inlet 102A, for example, may be disposed at a forward, upstream location 108A; e.g., at or about the compressor blade leading edge 74. The circuit inlet 102B may be disposed at an intermediate location 108B. This intermediate location 108B may be axially spaced aft, downstream from the upstream location 108A along the axial centerline 22. The intermediate location 108B may also or alternatively be circumferentially spaced from the upstream location 108A about the axial centerline 22. The circuit inlet 102C may be disposed at an aft, downstream location 108C such that, for example, the intermediate location 108B is between the upstream location 108A and the downstream location 108C. The downstream location 108C may be axially spaced aft, downstream from the intermediate location 108B along the axial centerline 22. The downstream location 108C may also or alternatively be circumferentially spaced from the intermediate location 108B about the axial centerline 22.

Figure 6:
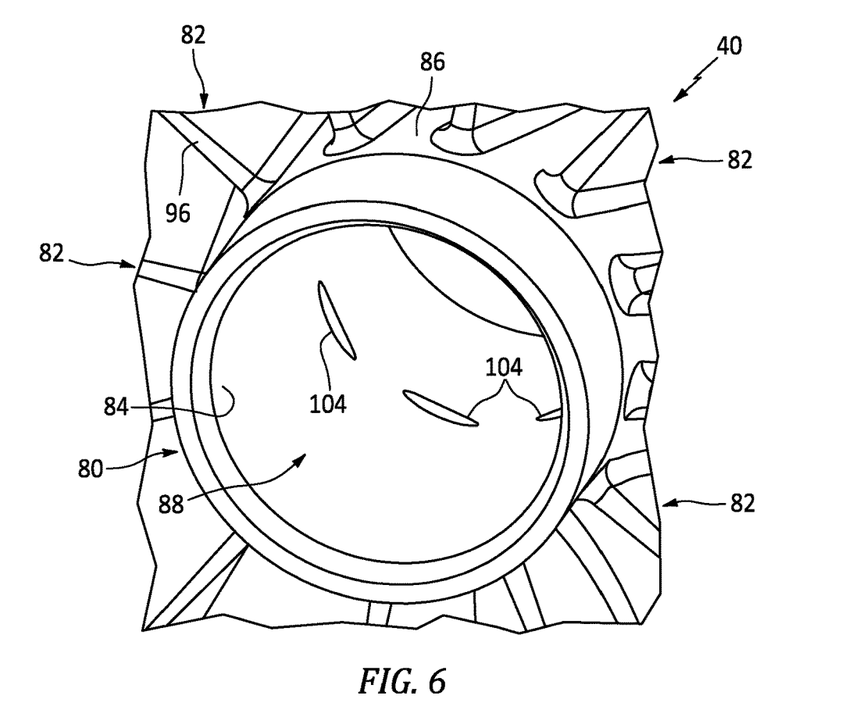
FIG. 6 is a perspective illustration of a portion of a turbine rotor.

Referring to FIG. 6, the circuit outlet 104 for a respective internal cooling circuit 60 (see FIGS. 2 and 4) may be disposed in the turbine inner surface 84. The circuit outlet 104 may be disposed at an intermediate location along the turbine rotor 40 leaving, for example, an aft, downstream portion of the turbine rotor 40 and its turbine hub 80 substantially uncooled. Of course, in other embodiments, the one or more of the internal cooling circuits 60 (see FIGS. 2 and 4) may extend further aft, downstream along the turbine rotor 40 and its turbine hub 80.

Figure 7:
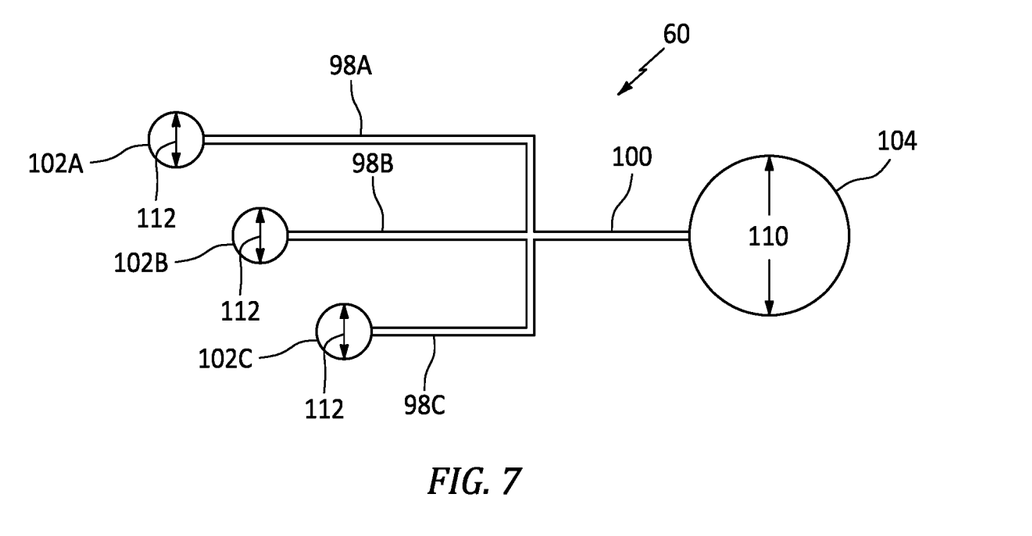
FIG. 7 is a schematic illustration of one of the internal cooling circuits.

Referring to FIG. 7, the circuit outlet 104 and the outlet passage 100 each have an outlet size 110; e.g., a diameter, a maximum width, etc. This outlet size 110 may be different (e.g., greater) than an inlet size (e.g., a diameter, a maximum width, etc.) of each circuit inlet 102 and each inlet passage 98. The outlet size 110, for example, may be selected such that a cross-sectional area (outlet area) of the circuit outlet 104 and/or the outlet passage 100 is exactly or approximately (e.g., +/−5%) equal to a cross-sectional area (inlet area) of each circuit inlet 102 and/or each inlet passage 98. Of course, in other embodiments, the outlet area may be different (e.g., greater or less) than the inlet area to decelerate or accelerate cooling air flowing through the respective internal cooling circuit 60.

During operation of the rotating assembly 58 of FIG. 2, some of the core air is bled from the core flowpath 36 within the compressor section 28 (see FIG. 1) and directed into the internal cooling circuits 60 through the circuit inlets 102 to provide cooling air. This cooling air is directed to the outlet passages 100. As this cooling air flows through the outlet passages 100, heat energy is transferred from the turbine rotor 40 and its turbine hub 80 into the cooling air. The heated cooling air is exhausted from the internal cooling circuits 60 (e.g., into the internal turbine bore 88) through the circuit outlets 104. The internal cooling circuits 60 may thereby utilize some of the relatively cool core air from the compressor section 28 (see FIG. 1) to cool the turbine rotor 40.

Figure 8A:
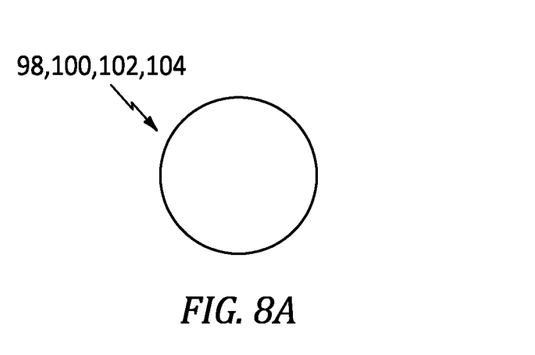
FIGS. 8A-8D are illustrations of various cross-sectional geometries for various cooling circuit elements.
Figure 8B:
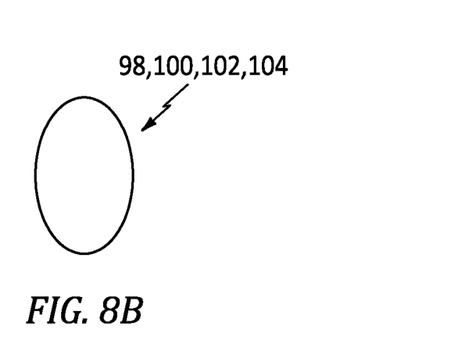
Figure 8C:
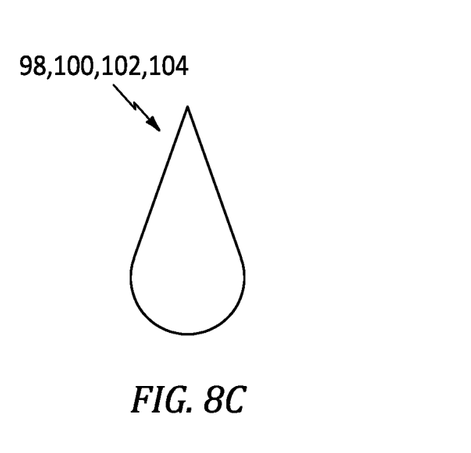
Figure 8D:
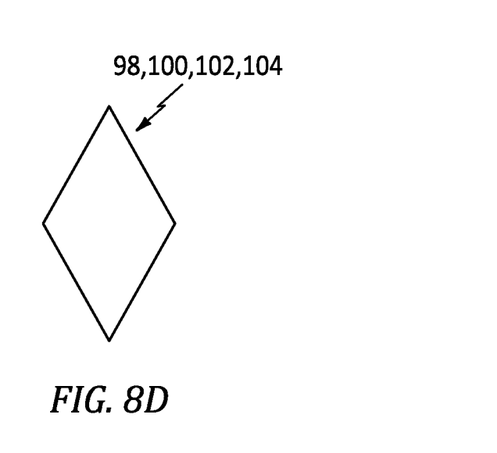

In some embodiments, referring to FIG. 8A, one or more or all of the internal cooling circuit elements 98, 100, 102 and 104 may each have a circular cross-sectional geometry. In other embodiments, referring to FIGS. 8B-D, one or more or all of the internal cooling circuit elements 98, 100, 102 and 104 may each have a non-circular cross-sectional geometry. Examples of the non-circular cross-sectional geometry include, but are not limited to, an oval cross-sectional geometry (e.g., see FIG. 8B), a teardrop shaped cross-sectional geometry (e.g., see FIG. 8C), and a polygonal (e.g., diamond shaped, triangular, rectangular, etc.) cross-sectional geometry (e.g., see FIG. 8D). The present disclosure, however, is not limited to the foregoing exemplary cross-sectional geometries. In some embodiments, all of the internal cooling circuit elements 98, 100, 102 and 104 may have a common (e.g., the same) cross-sectional geometry. In other embodiments, some or all of the internal cooling circuit elements 98, 100, 102 and 104 may have different, unique cross-sectional geometries. Furthermore, in some embodiments, each internal cooling circuit element 98, 100, 102, 104 may maintain a uniform cross-sectional geometry along its length. In other embodiments, one or more or all of the internal cooling circuit elements 98, 100, 102 and 104 may have a cross-sectional geometry that changes along at least a portion of its length.

Figure 9A:
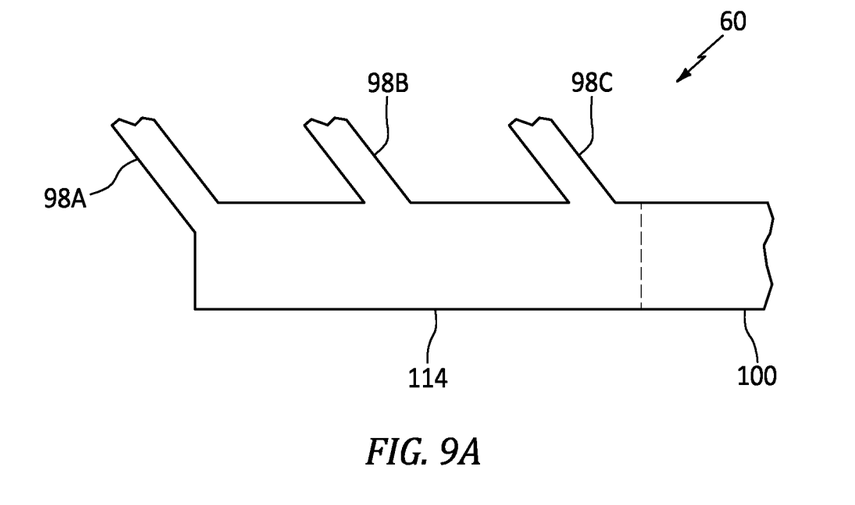
FIGS. 9A and 9B are schematic illustrations of various manifold arrangements for coupling a plurality of inlet passages with an outlet passage.
Figure 9B:
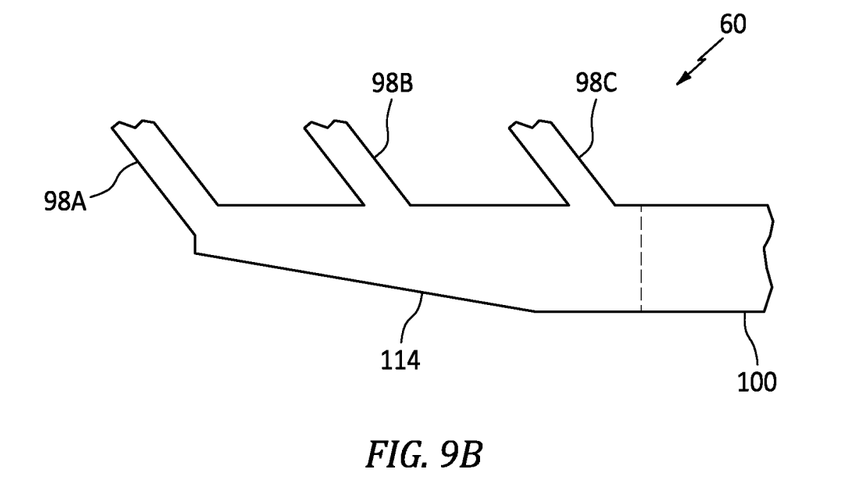

In some embodiments, referring to FIGS. 9A and 9B, one or more or all of the internal cooling circuits 60 may each include a manifold 114 between the one or more inlet passages 98 and the outlet passage 100. Referring to FIG. 9A, this manifold 114 may have a constant cross-sectional geometry along its longitudinal length. Referring to FIG. 9B, the manifold 114 may alternatively be tapered such that an area of its cross-sectional geometry increased as more inlet passages 98 are connected. This manifold 114 may be discrete from the outlet passage 100, or configured as an upstream section of the outlet passage 100.

Figure 10:
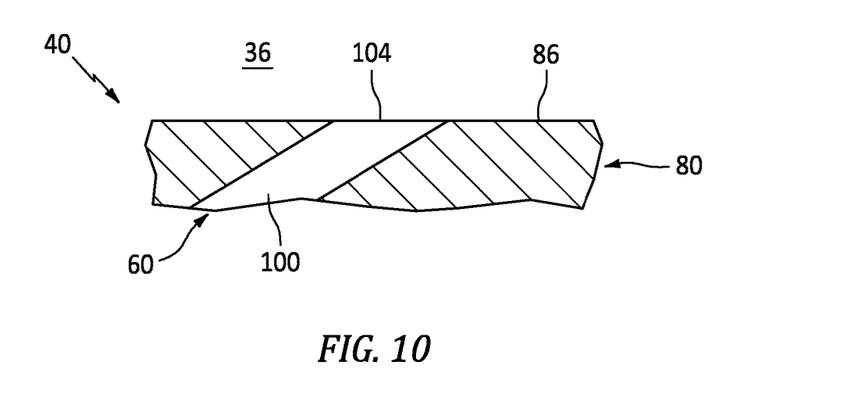
FIG. 10 is a sectional illustration of a portion of a turbine rotor with a circuit outlet in a gas path surface.
Figure 11:
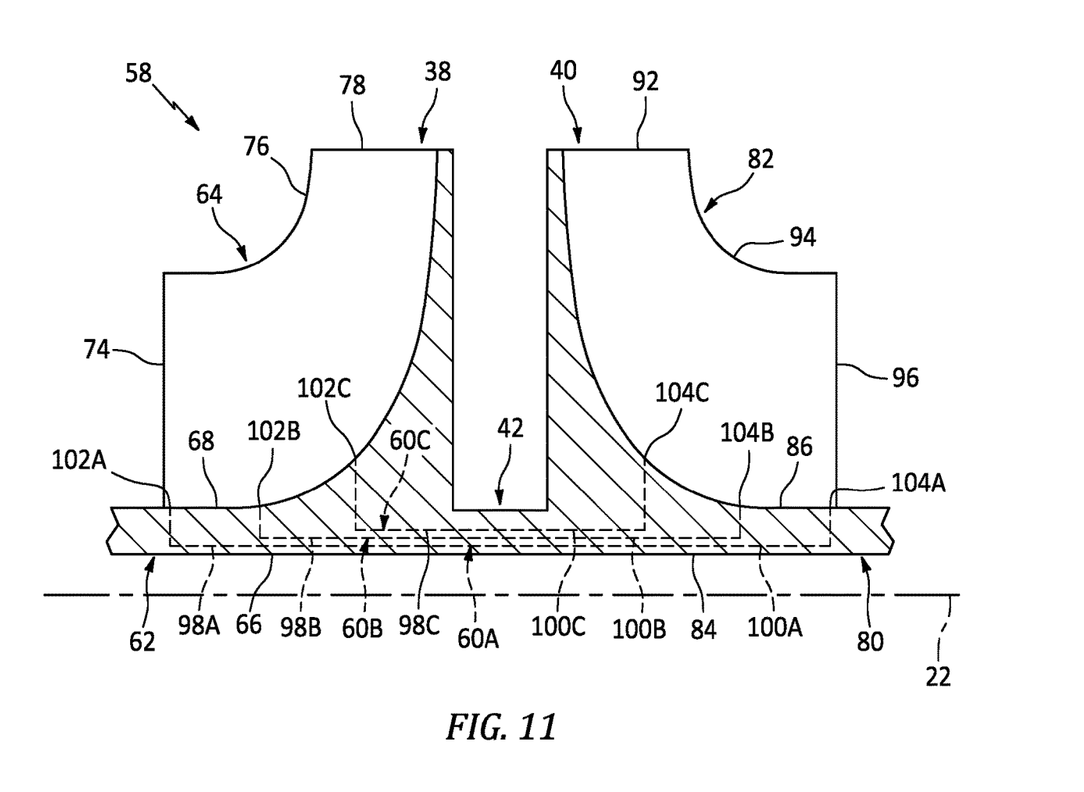
FIG. 11 is a partial, sectional schematic illustration of the rotating assembly with alternative internal cooling circuits.

In some embodiments, referring to FIGS. 10 and 11, one or more or all of the circuit outlets 104 may each be disposed in the turbine gas path surface 86.

In some embodiments, referring to FIG. 11, one or more of the internal cooling circuits 60A, 60B, 60C (generally referred to as 60) may include a single one of the inlet passages 98A, 98B, 98C and a single outlet passage 100A, 100B, 100C (generally referred to as 100). In such embodiments, the circuit outlet 104A, 104B, 104C (generally referred to as 104) may be disposed at a similar, but opposite (e.g., mirror image) location on the turbine rotor 40 as the circuit inlet 102A, 102B, 102C is disposed on the compressor rotor 38. For example, where the circuit inlet 102A is disposed at or about a respective compressor blade leading edge 74, the respective circuit outlet 104A for the same internal cooling circuit 60 may be disposed at or about a respective turbine blade trailing edge 96, and so on. With such an arrangement, relatively low pressure core air may be used for cooling a relatively cool portion of the turbine rotor 40 and its turbine hub 80. By contrast, relatively high pressure core air may be used for cooling a relatively hot portion of the turbine rotor 40 and its turbine hub 80.

In some embodiments, referring to FIGS. 1, 2 and 11, the rotating assembly 58 and its components 38, 40 and 42 may be formed as a monolithic body. The rotating assembly 58 and its components 38, 40 and 42, for example, may be additively manufactured, cast, machined and/or otherwise forms as a single, unitary body. By contrast, a non-monolithic body includes components that are discretely formed and subsequently attached together. The present disclosure, however, is not limited to the foregoing exemplary formation processes.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a compressor rotor comprising a gas path surface, a compressor hub and a plurality of compressor blades, the compressor hub comprising the gas path surface, the plurality of compressor blades arranged circumferentially about the compressor hub, the plurality of compressor blades projecting out from the gas path surface, and the plurality of compressor blades comprising a first compressor blade;
   a turbine rotor rotatable with the compressor rotor about a rotational axis; and
   a cooling circuit comprising an inlet in the gas path surface, the cooling circuit extending helically from the inlet, through the compressor rotor and into the turbine rotor to an outlet, and the inlet disposed at a leading edge of the first compressor blade;
   wherein the inlet is fluidly coupled to the outlet.

2. The assembly of claim 1, further comprising:
   a shaft connected to and extending axially between the compressor rotor and the turbine rotor;
   the cooling circuit extending through the shaft from the compressor rotor to the turbine rotor.

3. The assembly of claim 1, wherein at least one of
   the compressor rotor is configured as a radial flow compressor rotor; or
   the turbine rotor is configured as a radial flow turbine rotor.

4. The assembly of claim 1, wherein at least the compressor rotor and the turbine rotor are formed together as a monolithic body.

5. The assembly of claim 1, wherein
   the turbine rotor comprises a turbine rotor surface; and
   the outlet disposed in the turbine rotor surface.

6. The assembly of claim 5, wherein the turbine rotor surface comprises a turbine gas path surface.

7. The assembly of claim 5, wherein
   the turbine rotor comprises a turbine hub and a plurality of turbine blades; and
   the plurality of turbine blades are arranged circumferentially about the turbine hub, and the plurality of turbine blades project out from the turbine rotor surface.

8. The assembly of claim 5, wherein the turbine rotor surface forms a peripheral boundary of a bore in the turbine rotor.

9. The assembly of claim 5, wherein the cooling circuit consists of the inlet, the outlet and a passage extending from the inlet to the outlet.

10. The assembly of claim 5, wherein
    the cooling circuit further comprises a second inlet in the gas path surface; and
    the cooling circuit extends from the second inlet, through the compressor rotor and into the turbine rotor fluidly coupling the second inlet to the outlet.

11. The assembly of claim 10, wherein
    the inlet and the second inlet are circumferentially adjacent the first compressor blade; and
    the second inlet is spaced axially downstream of the inlet along the first compressor blade.

12. The assembly of claim 10, wherein the second inlet is circumferentially spaced from the inlet about the rotational axis.

13. The assembly of claim 10, wherein
    the cooling circuit includes a first capillary, a second capillary and an artery;
    the first capillary extends from the inlet to the artery;
    the second capillary extends from the second inlet to the artery; and
    the artery extends to the outlet.

14. The assembly of claim 13, wherein at least one of
    the first capillary is a helical capillary;
    the second capillary is a helical capillary; or
    the artery is a helical artery.

15. The assembly of claim 5, wherein at least a portion of the cooling circuit spirals about the rotational axis as the cooling circuit extends from the inlet to the outlet.

16. The assembly of claim 1, further comprising:
    a second cooling circuit comprising a second inlet in the gas path surface;
    the second cooling circuit extending from the second inlet, through the compressor rotor and into the turbine rotor.

17. An assembly for a gas turbine engine, comprising:
    a monolithic body rotatable about a rotational axis, the monolithic body comprising a compressor rotor, a turbine rotor and a cooling circuit;
    the compressor rotor comprising a compressor hub and a plurality of compressor blades arranged circumferentially about and connected to the compressor hub, and each of the plurality of compressor blades extending out from a gas path surface of the compressor hub;
    the turbine rotor comprising a turbine hub and a plurality of turbine blades arranged circumferentially about and connected to the turbine hub;
    the cooling circuit extending within the monolithic body from a first inlet in the gas path surface to an outlet in the turbine rotor; and
    the compressor rotor further comprising a second inlet and a third inlet, the second inlet in the gas path surface, the third inlet in the gas path surface, and the second inlet axially between the first inlet and the third inlet along the gas path surface;
    wherein the first inlet is fluidly coupled to a first inlet passage with a first helical geometry;
    wherein the second inlet is fluidly coupled to a second inlet passage with a second helical geometry; and
    wherein the first inlet passage and the second inlet passage are fluidly coupled to the outlet.

18. The assembly of claim 11, wherein
    the cooling circuit further comprises a third inlet in the gas path surface;
    the third inlet is circumferentially adjacent the first compressor blade; and
    the third inlet is spaced axially downstream of the second inlet along the first compressor blade.

19. The assembly according to claim 17, wherein
    the first inlet passage with the first helical geometry has a first pitch;
    the second inlet passage with the second helical geometry has a second pitch; and
    the outlet has a third helical geometry with a third pitch that is different than the first pitch and the second pitch.

* * * * *